United States Patent
Dobbins et al.

(10) Patent No.: US 11,867,369 B1
(45) Date of Patent: Jan. 9, 2024

(54) LINKING ASSEMBLIES FOR LAMPS

(71) Applicant: DIODE DYNAMICS, L.L.C., St. Charles, MO (US)

(72) Inventors: Trevor Dobbins, St. Charles, MO (US); Tom Kornblum, Pevely, MO (US)

(73) Assignee: Diode Dynamics, L.L.C., St. Charles, MO (US)

( * ) Notice: Subject to any disclaimer, the term of this patent is extended or adjusted under 35 U.S.C. 154(b) by 0 days.

(21) Appl. No.: 17/978,095

(22) Filed: Oct. 31, 2022

(51) Int. Cl.
*F21S 41/19* (2018.01)
*F21W 107/10* (2018.01)

(52) U.S. Cl.
CPC ........ *F21S 41/192* (2018.01); *F21W 2107/10* (2018.01)

(58) Field of Classification Search
CPC ............... F21S 41/192; F21Y 2105/10; F21Y 2103/10; F21L 4/02; F21V 21/30; F21V 14/02; F21V 21/06; F21V 21/14; F21V 15/015; F21V 21/26; F21V 17/02; F21V 19/0035; F21V 21/005
See application file for complete search history.

(56) References Cited

U.S. PATENT DOCUMENTS 4,527,224 A * 7/1985 Sangiamo ............... F16M 11/08
362/322
8,072,123 B1 * 12/2011 Han ......................... F21K 9/65
313/45

* cited by examiner

*Primary Examiner* — Omar Rojas Cadima
(74) *Attorney, Agent, or Firm* — Harness, Dickey & Pierce, P.L.C.

(57) ABSTRACT

Linking assemblies are provided for attaching multiple lamps together. One example lamp assembly includes a linking member and first and second fastening devices. The linking member includes first and second sides. The first side includes surface defining a first channel, and the second side includes a surface defining a second channel. The first fastening device is configured to extend through the first channel, thereby securing the first side of the linking member to a side of a first lamp. The second fastening device is configured to extend through the second channel, thereby securing the second side of the linking member to a side of a second lamp. An angle between the first side of the linking member and the side of the first lamp is adjustable based on contact of the side of the first lamp along the surface of the first side.

19 Claims, 9 Drawing Sheets

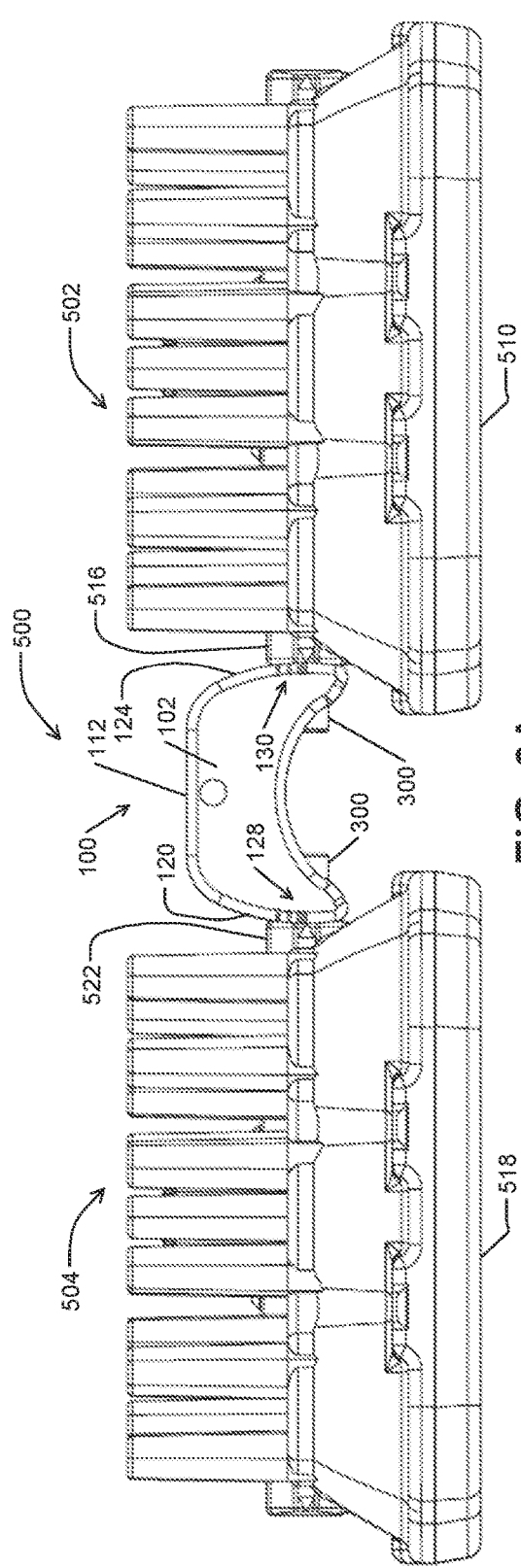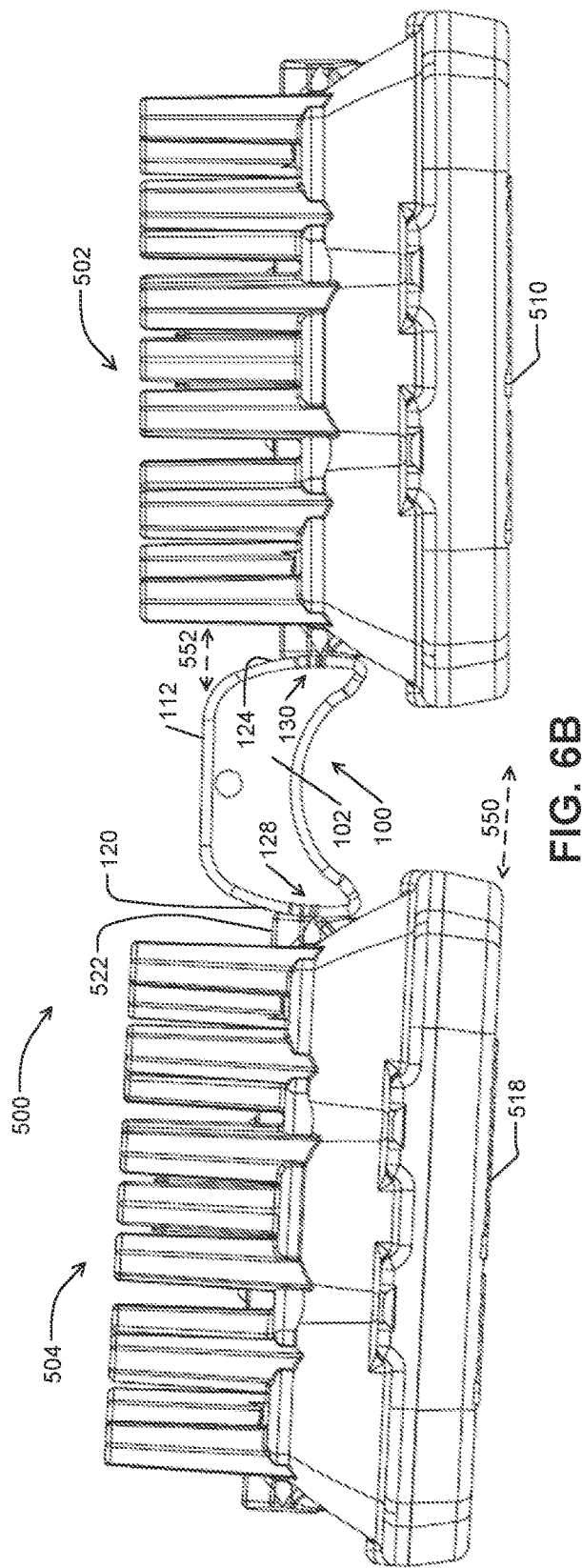

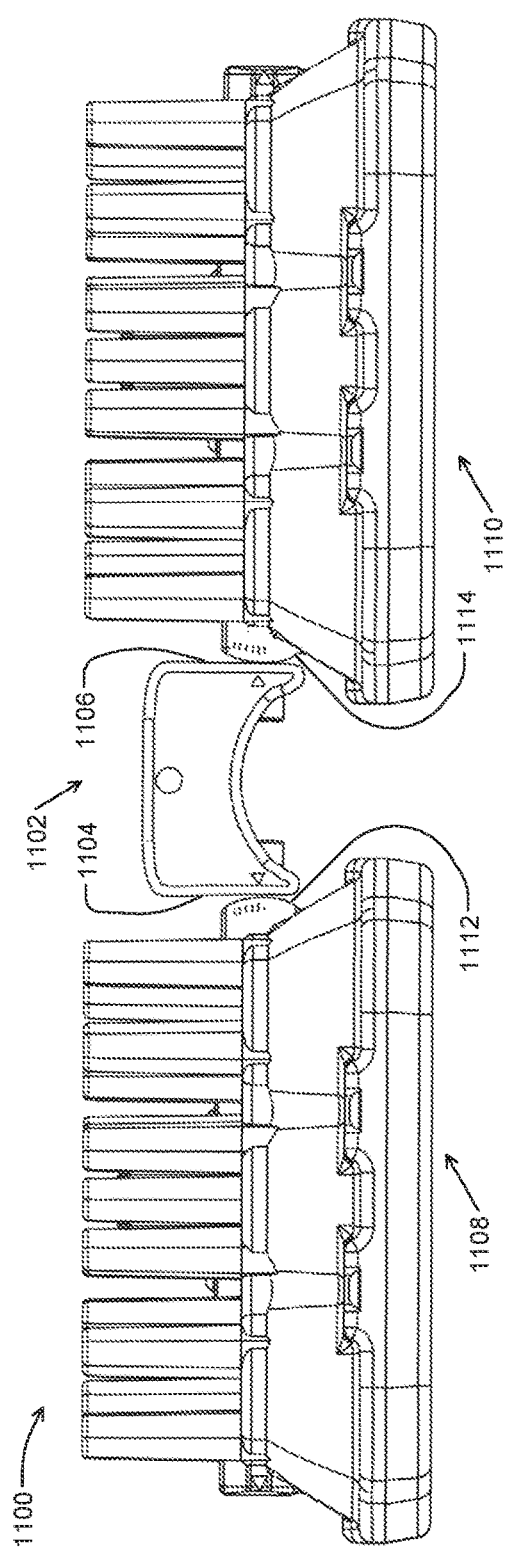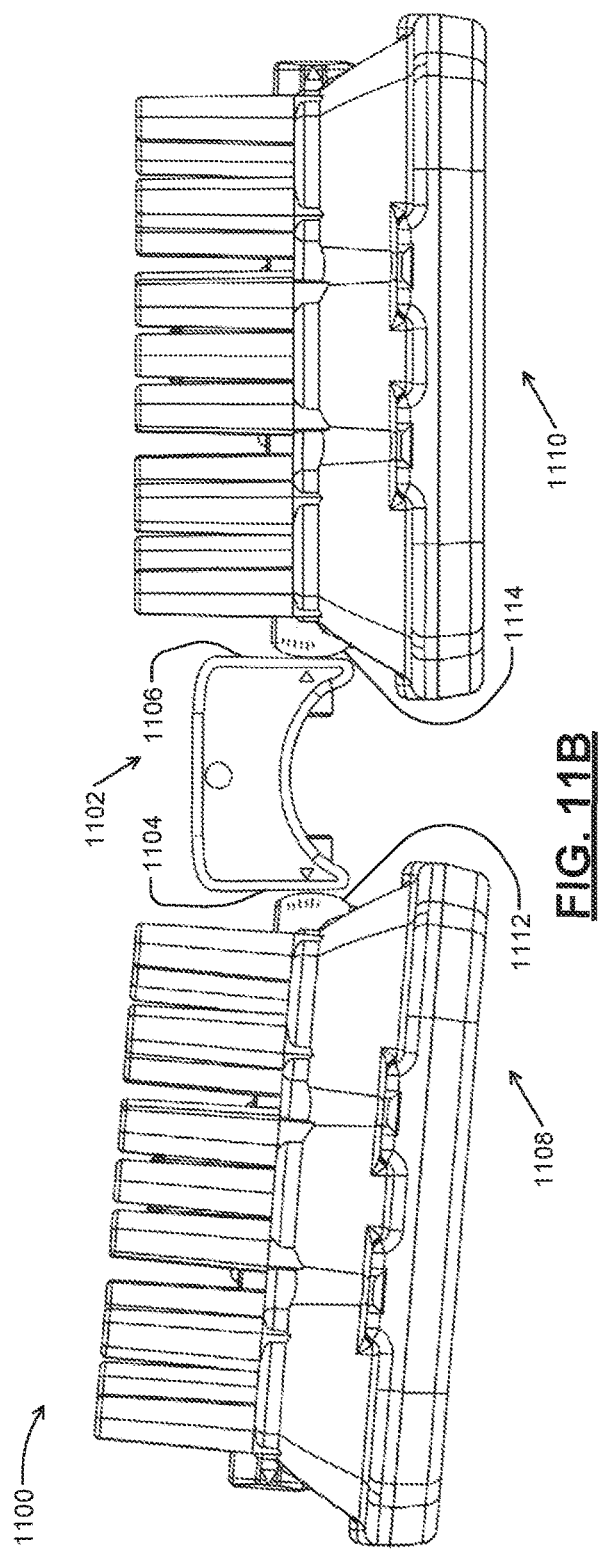
FIG. 11A
FIG. 11B

LINKING ASSEMBLIES FOR LAMPS

FIELD

The present disclosure generally relates to linking assemblies for attaching lamps together in light arrays (e.g., adjacent lamps, etc.).

BACKGROUND

This section provides background information related to the present disclosure which is not necessarily prior art.

Vehicles are known to include light bars, which are often aftermarket auxiliary light bars, attached to roofs, bumper bars, or roll bars of the vehicles. The light bars may consist of a single bar construction or a series of individual lamps positioned in a row. For mounting the series of individual lamps to a vehicle, a user can separately attach individual lamps to a shared mounting surface such as a roof rack or a bumper cattle bar of the vehicle, or separately attach individual lamps to a mounting rail and then mount the mounting rail to the vehicle. Alternatively, a user can attach a series of individual lamps together through a one-piece un-hinged bracket, whereby the lamps are retained in a straight line, or through a pin-style hinged or multi-piece bracket, whereby the lamps may define a curve. The brackets are known to be attached to the backs of the lamp arrays.

DRAWINGS

The drawings described herein are for illustrative purposes only of selected embodiments and not all possible implementations, and are not intended to limit the scope of the present disclosure.

FIG. 6A is a top view of the light array assembly of FIG. 5, where the two lamps and the linking member are aligned in a straight configuration;

FIG. 6B is a top view of the light array assembly of FIG. 5, where one lamp and the linking member are aligned in a curved configuration and the other lamp and the linking member are aligned in a straight configuration;

FIG. 11A is a top view of an example light array assembly of the present disclosure, which includes two lamps and a linking member aligned in a straight configuration; and FIG. 11B is a top view of the light array assembly of FIG. 11A, where one lamp and the linking member are aligned in a curved configuration and the other lamp and the linking member are aligned in a straight configuration.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

A light bar for installation on a vehicle may be formed by linking together a series of individual lamps. In doing so, the individual lamps are linked together through a rigid mounting rail or to multiple rigid plates mounted to backsides of adjacent lamps to form a straight, non-adjustable series of lamps, or through pin-type hinged or multi-piece unhinged brackets to form a curved, adjustable series of lamps. However, linking individual lamps through pin-type hinge assemblies requires multiple and usually additional visible parts protruding from the lamps. Additionally, multi-piece unhinged brackets require costly additional parts. As such, the options for linking a series of individual lamps is either rigid and prevents desirable adjustments of orientations of the individual lamps, or requires multiple additional components, which are costly and visually obtrusive, etc.

Uniquely, the linking assemblies described herein enable the direct linking of individual lamps (e.g., adjacent lamps, etc.) through specifically shaped channels/sides of the linking assemblies and corresponding openings on sides of the lamps to form a light array, which may be straight or curved.

In particular, the linking assemblies include linking members having curved or flat sides/channels configured to abut against corresponding flat or curved facing sides of adjacent lamps, and fastening devices configured to extend through channels in the sides of the linking members and into openings in the sides of adjacent lamps. With this configuration, the linking members herein are tightened with the specific orientation between the linking members and the lamps being retained. As such, the linking assemblies provide a low-cost, convenient and structurally sound way of linking adjacent lamps together with limited components, while also enabling desirable angular adjustability between the adjacent lamps to form straight or curved light arrays.

Figure 1:
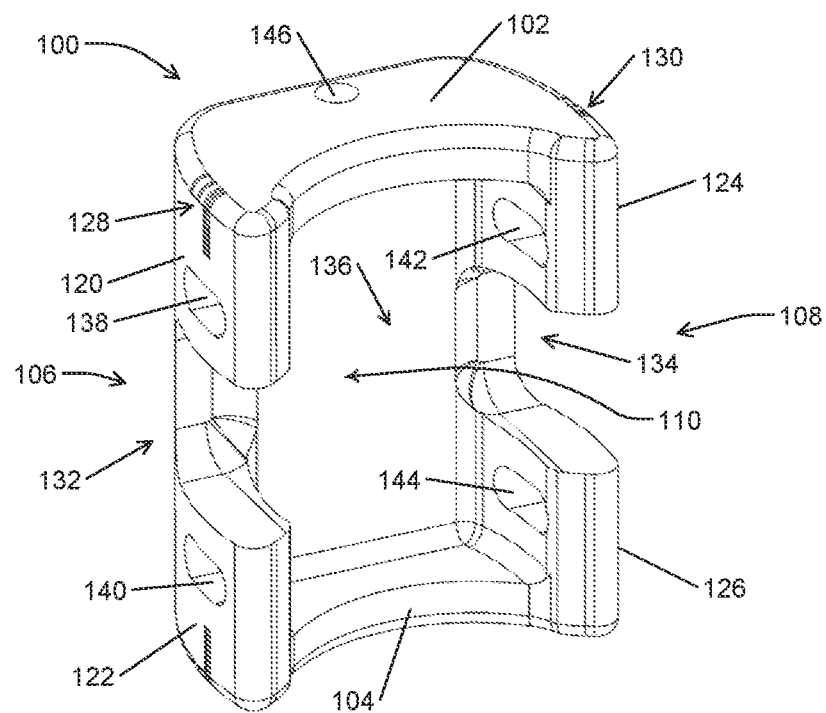
FIG. 1 is an isometric view of an example linking member of the present disclosure.
Figure 2:
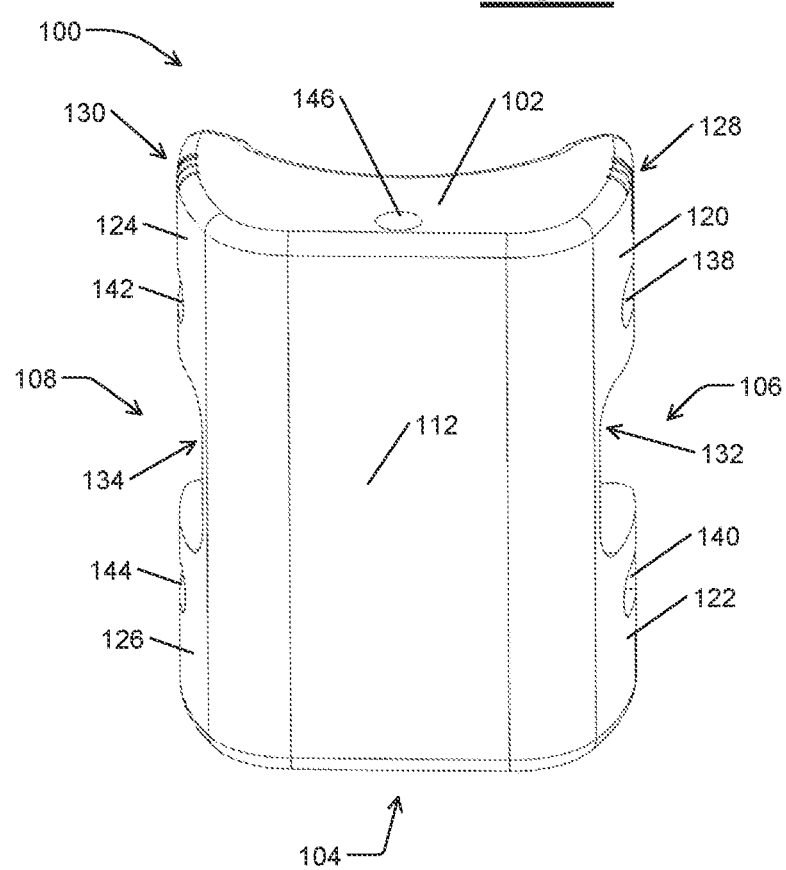
FIG. 2 is back view of the linking member of FIG. 1.
Figure 3:
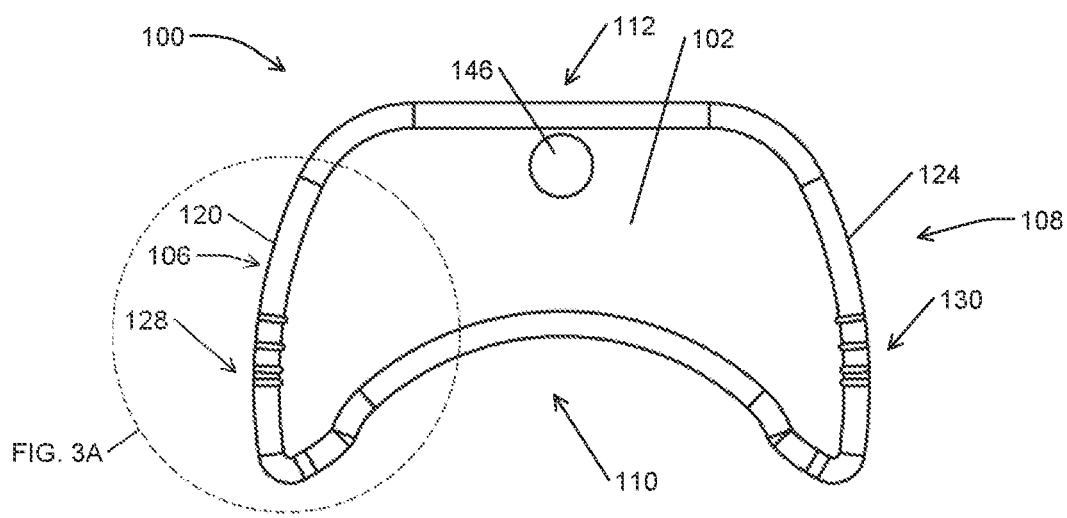
FIG. 3 is a top view of the linking member of FIG. 1.

FIGS. 1-3 illustrate an example linking member 100 including one or more aspects of the present disclosure, for use in connection with one or more fastening devices in a linking assembly to link adjacent lamps together. Although the linking member 100 is presented in one specific arrangement in FIGS. 1-3, other embodiments may include linking members arranged otherwise depending on, for example, the shape, size, configuration, etc. of lamps, etc.

As shown in FIGS. 1-3, the illustrated linking member 100 generally includes a top 102, a bottom 104, and sides 106, 108, 110, 112 extending between the top 102 and bottom 104. As shown, the sides 106, 108 generally oppose each other, and the sides 110, 112 generally oppose each other. It should be appreciated that, in this exemplary embodiment, as shown, the member 100 includes a solid construction, and therefore, does not include any pin-type hinge, or other structure, which permits a part of the member 100 to pivot or move relative to another part of the member 100. That said, other constructions may be provided in other example embodiments.

The top 102 and the bottom 104 are substantially similar in size and shape. For example, the top 102 and the bottom 104 generally include a curved front edge along the side 110 of the linking member 100, a flat back edge along the generally flat side 112, and curved side edges along the sides 106, 108. In the illustrated embodiment, the top 102 and the bottom 104 extend in parallel planes and are separated by the sides 106, 108, 110, 112.

The top 102 of the linking member 100 defines an opening 146 generally located in a middle portion thereof. More specifically, in this embodiment, the opening 146 is located at substantially equal distances from the sides 106, 108. The opening 146 is generally used for mounting an accessory to the linking member 100. For example, the opening 146 is configured (e.g., sized, shaped, etc.) to receive a mounting structure (e.g., a bracket, etc.) of an accessory, thereby allowing a user to easily mount the accessory to the linking member 100. The accessory may include, for example, a support arm for carrying some of the load of a light bar (when assembled), a camera, a lamp, etc. Although the linking member 100 is shown and described as including the opening 146 in a specific location in the top 102, it should be appreciated that the linking member 100 may be arranged differently. For example, the linking member 100 may not include the opening 146, the opening 146 may be located at a different location in the top 102, the opening 146 may be positioned in another component of the linking member 100, etc. Additionally, it should be appreciated the linking member 100 (including the top 102) may include more than one opening providing similar functionality as the opening 146.

The sides 106, 108 are also substantially similar in size and shape. For example, each side 106, 108 generally includes two arms 120, 122, 124, 126 having outer mating surfaces, which are configured to abut against sides (or side surfaces) of lamps, as further explained below. In the illustrated embodiment, the arms 120, 122, 124, 126 have generally mirrored shapes. More specifically, the side 106 includes arms 120, 122, and the side 108 includes arms 124, 126 having generally mirrored shapes with respect to the arms 120, 122.

As shown in FIGS. 1-2, the arms 120, 124 extend from the top 102 and the side 112, and the arms 122, 126 extend from the bottom 104 and the side 112.

In the illustrated embodiment, the sides 106, 108 are generally curved. Specifically, the arms 120, 122, 124, 126 are curved along their outer mating surfaces (or curved mating surfaces). In FIGS. 1-3, in the illustrated embodiment, the curvature of each arm 120, 122, 124, 126 has a radius of about 40 mm (1.6 inches). With that said, it should be appreciated that the curvature of the arms 120, 122, 124, 126 may be different based on, for example, a desired range of angular adjustment of a light bar, etc. (e.g., greater than about 40 mm, less than about 40 mm, etc.).

In various embodiments, the curvature of the arms 120, 122, 124, 126 may change along the outer mating surfaces. In other words, the rate of curvature along the arms 120, 122, 124, 126 between the sides 110, 112 may change. For example, near the side (e.g., a front side, etc.) 110 of the linking member 100, the curvature of the arms 120, 122, 124, 126 may be relatively small such that the arms 120, 122, 124, 126 near the front side 110 are mostly flat (or have minimal curve). However, near the side (e.g., a back side, etc.) 112 of the linking member 100, the curvature of the arms 120, 122, 124, 126 may be larger than the curvature near the front side 110. As such, the arms 120, 122, 124, 126 near the back side 112 have a more pronounced curve than near the front side 110.

It should be understood that the curvature of the arms 120, 122, 124, 126 may be continuous, as shown, or may consistent of a series of flat surfaces or curved surfaces (e.g., convex or concave, etc.) to define the overall curvature. It should be further appreciated that the surface of the arms 120, 122, 124, 126 may include one or more materials to enhance and/or or aid in retaining contact between the member 100 and the respective lamps. For example, the surface of the arm 120 may include or be coated with a substance have a high coefficient of friction, or the surface may device a texture to engage a corresponding surface of the lamp. More generally, the arms of the member (e.g., as consistent with member 100, or otherwise, etc.) or other parts of the member may be structured to cooperate with one or more corresponding surfaces of the lamp(s) to promote contact and/or retention of the specific relative position therebetween.

With continued reference to FIGS. 1-3, the sides 106, 108 include indicia 128, 130 configured to indicate a different angle of abutment between the sides 106, 108 of the linking member 100 and the sides of the lamps, when the linking member 100 and the lamps are linked (as further explained below). More specifically, the arm 120 includes the indicia 128 between the sides 110, 112 to represent different curvatures, and the arm 124 includes the indicia 130 (corresponding to the indicia 128) between the sides 110, 112 to represent different curvatures. In the illustrated embodiment, the indicia 128 is represented by a series of four vertically extending notches (or other visual distinctions) extending from an upper portion of the arm 120 and onto the top 102, and the indicia 130 is represented by a series of four vertically extending notches (or other visual distinctions) (corresponding to the notches of the indicia 128) extending from an upper portion of the arm 124 and onto the top 102. In such examples, each corresponding vertical notch (of the sides 106, 108) represents a different angle of abutment between the sides 106, 108 of the linking member 100 and the sides of the lamps, when the linking member 100 and the lamps are linked and the lamps are aligned with the specific ones of the indicia 128, 130. Stated another way, the indicia 128, 103 provides a visual cue for the user to align the lamps to a specific and/or uniform curvature, etc.

Figure 3A:
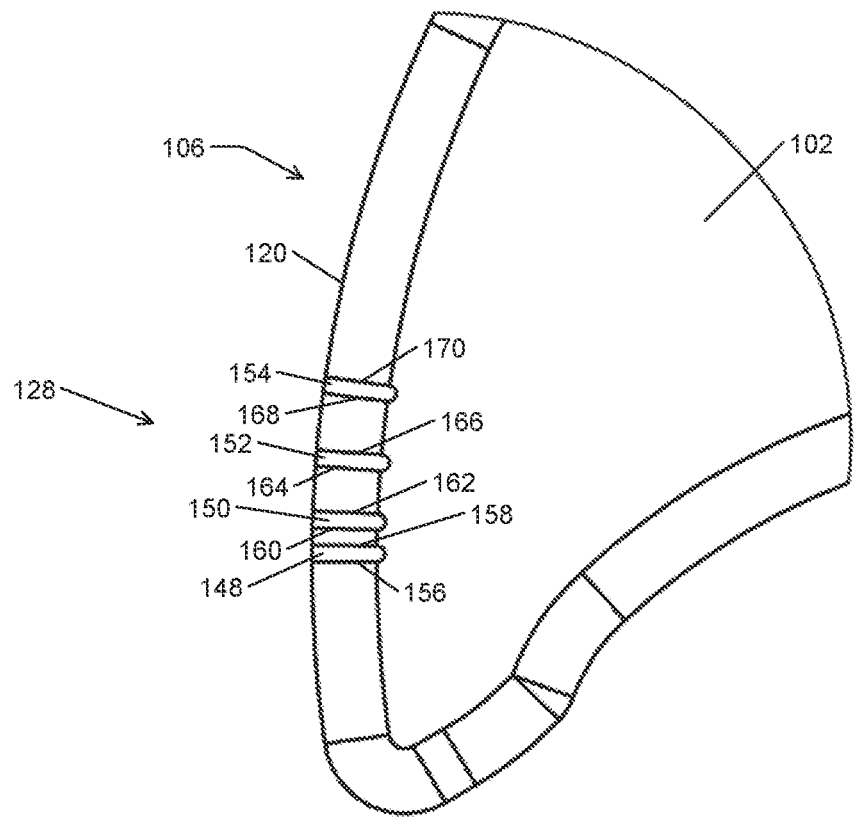
FIG. 3A is a further top view of the linking member of FIG. 1.

For example, and as shown in FIG. 3A, the indicia 128 includes four notches 148, 150, 152, 154 representing different angles of abutment between the side 106 (e.g., a mating surface of the side 106, etc.) and a side of an adjacent lamp. Specifically, in this embodiment, an edge 156 of the notch 148 represents about a zero-degree angle (or no angle) between the side 106 of the linking member 100 and the lamp, and an edge 158 of the notch 148 represents angle of about 0.8 degrees between the side 106 of the linking member 100 and the lamp. Additionally, edges 160, 162 of the notch 150 represent angles of about 1.5 degrees and about 2.3 degrees, respectively, between the side 106 of the linking member 100 and the lamp. Edges 164, 166 of the notch 152 represent angles of about 4.5 degrees and about 5 degrees, respectively, between the side 106 of the linking member 100 and the lamp, and edges 168, 170 of the notch 154 represent angles of about 7.5 degrees and about 8 degrees, respectively, between the side 106 of the linking member 100 and the lamp. The above-mentioned angles are between the linking member 100 and a single lamp. The indicia 130 on the side 108 may be similarly arranged.

While a particular number of configured indicia 128, 130 are shown in FIGS. 1-3A, it should be appreciated that the linking member 100 may include other indicia (in addition to or instead of the indicia 128, 130) located on the arms 120, 124 or other portions of the sides 106, 108 and/or having a different number/configuration (e.g., three lines of different colors, six dots, five numerals (e.g., 1-5, etc.), four letters (e.g. A-D, etc.), etc.), having a different arrangement/spacing of notches to represent different angles, etc.

With continued reference to the embodiment of FIGS. 1-3, the linking member 100 defines multiple different recesses. For example, the sides 106, 108 generally define recesses 132, 134, 136. More specifically, the arms 120, 122 of the side 106 define the recess (or outer recess) 132 therebetween, and the arms 124, 126 of the side 108 define the recess (or outer recess) 134 therebetween. Additionally, the sides 106, 108 (including their arms 120, 122, 124, 126) define the recess (or inner recess) 136. The recesses 132, 134, 136 may be configured (e.g., sized, shaped, etc.) to provide space and/or access for attaching the linking member 100 to adjacent lamps, attaching other components to the lamps, etc., as further explained below. For example, the recess 132 may be structured to permit screw-driver access to each of channels 142, 144, etc.

Although the linking member 100 is shown and described as including three particularly arranged recesses, it should be appreciated that the linking member 100 may include more or less (sometimes no) recesses arranged in different portions of the linking member 100. For example, in some embodiments, the recesses 132, 134 may be omitted (if desired).

With continued reference to FIGS. 1-3, the sides 106, 108 define multiple channels extending therethrough, each of which is configured to receive a fastening device for linking adjacent lamps together, as further explained below. More specifically, the arm 120 of the side 106 defines a channel 138, the arm 122 of the side 106 defines a channel 140, the arm 124 of the side 108 defines a channel 142, and the arm 126 of the side 108 defines a channel 142. In the illustrated embodiment, the channels 138, 140, 142, 144 have generally the same configuration. For example, each channel 138, 140, 142, 144 has a slot shape, which may define a rectangle, oval, rounded rectangle, or other similar shape, etc., which extends from the outer curved mating surface of its respective arm 120, 122, 124, 126 to the inner recess 136. Additionally, each channel 138, 140, 142, 144 extends in a plane substantially perpendicular to a long axis of its respective side 106, 108. Although the linking member 100 is shown and described as including four particularly arranged channels, each extending through one of the arms 120, 122, 124, 126, it should be appreciated that the linking member 100 may include more or less channels arranged in different portions of the linking member 100. For example, in some embodiments, the linking member 100 may include two channels, one on each side 106, 108 if desired.

The linking member 100 of FIGS. 1-3 is a monolithic body. In other words, the linking member 100 is a single piece construction formed of a material such as a metallic material (e.g., aluminum, steel including stainless steel, etc.), plastic, etc., depending on, for example, the weight, material, etc. of the lamps. In general, the member 100 is structured to be rigid, whereby the member 100 is not intended to be bent or otherwise deformed (relative to itself) in order to provide a curvature of an array of lamps. Although the linking member 100 is shown and described as being a monolithic body, it should be appreciated that the linking member 100 may be formed of separate parts coupled together. For example, in some embodiments, the top 102, the bottom 104, and the sides 106, 108, 110, 112 may be separate parts coupled together to form the linking member 100. In other examples, the linking member 100 may be formed of two pieces. With this arrangement, one or both pieces may attach to lamps or one piece may attach to a lamp or a mounting bracket.

Figure 4A:
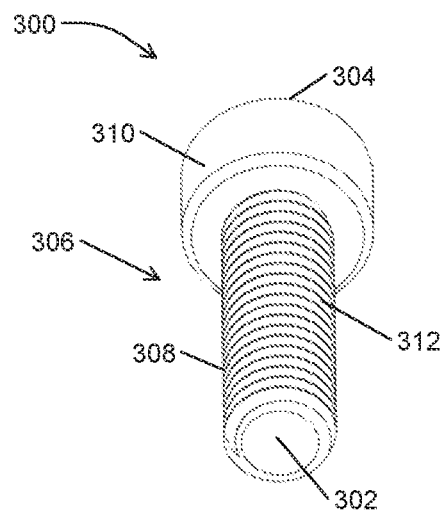
FIG. 4A is an isometric view of an example fastening device of the present disclosure, for use in attaching a linking member and a lamp together.

FIG. 4A illustrates an example fastening device 300 including one or more aspects of the present disclosure, for use in connection with a linking member (e.g., the linking member 100 of FIGS. 1-3, etc.) in a linking assembly to link adjacent lamps together. Although the fastening device 300 is presented in one specific arrangement in FIG. 4A, other embodiments may include fastening devices arranged otherwise depending on, for example, the shape, size, configuration, etc. of lamps, the linking member, etc.

As shown in FIG. 4A, the illustrated fastening device 300 is a bolt generally including opposing ends 302, 304 and an elongated cylindrical member 306 extending between the ends 302, 304. The cylindrical member 306 includes a shank 308 and a head 310, where the head 310 defines a diameter larger than the diameters of the shank 308. The shank 308 extends between the end 302 and the head 310, and the head 310 extends between the shank 308 and the end 304.

The fastening device 300 is configured to attach the linking member (e.g., the linking member 100 of FIGS. 1-3, etc.) to a lamp. For example, the shank 308 of the fastening device 300 includes threads 312 and is configured to enter one of the channels of FIGS. 1-2 (e.g., the channel 138, etc.), such that the end 302 of the fastening device 300 passes through the channel 138 and into a threaded opening of the lamp, as further explained below. In this example, the diameter of the head 310 is larger than a diameter (or width) of the channel 138. As such, when the fastening device 300 is inserted into the channel 138 and the end 302 is inserted into the opening of the lamp, the head 310 of the fastening device 300 is configured to pulled and secured against an inner surface of the arm 120 (a surface facing the recess 136) by screwing the threaded shank 308 into the threaded opening of the lamp (e.g., via a wrench such as an Allen wrench, a ratchet, a screwdriver, etc.), thereby attaching the linking member 100 to the lamp.

Other fastening devices 300 may be arranged in a similar manner with respect to the other channels 140, 142, 144 of FIGS. 1-2, and respective lamps.

Although the fastening device 300 is shown and described as being a threaded bolt for attaching the linking member (e.g., the linking member 100 of FIGS. 1-3, etc.) to a lamp, it should be appreciated that other fastening devices (e.g., screws, pins, etc.) having a different configuration may be employed to attach the linking member to a lamp. In addition, for example, the fastening device 300 may be augmented. In one example embodiment, the fastening device 300 may include a textured surface or protrusion on the bottom surface of the head 310, which is configured, then, to interact with the surface facing the recess 136, to hold or "lock" in some instances, the fastening device 300 into the opening of the lamp. Additionally, or alternatively, in another example embodiment, a lock-type washer (not shown) may be used in combination with the fastening device 300 to similarly hold or "lock" in some instances, the fastening device 300 into the opening of the lamp.

Figure 4B:
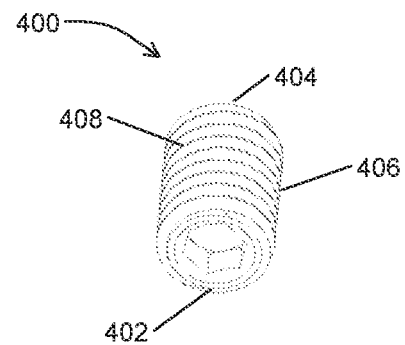
FIG. 4B is an isometric top view of an example set bolt of the present disclosure.

FIG. 4B illustrates an example set bolt 400 including one or more aspects of the present disclosure, for use in a linking assembly and adjacent lamps. Although the set bolt 400 is presented in one specific arrangement in FIG. 4B, other embodiments may include set bolts arranged otherwise depending on, for example, the shape, size, configuration, etc. of lamps, the linking member, etc.

As shown, the illustrated set bolt 400 generally including opposing ends 402, 404 and an elongated cylindrical shank 406 extending between the ends 402, 404. In the illustrated embodiment, the cylindrical shank 406 includes threads 408. The set bolt 400 is generally configured to fill an unused threaded opening of a lamp, thereby protecting the unused opening. For example, the end 402 of the set bolt 400 is configured to enter a threaded opening of the lamp that is not used by a fastening device (e.g., the fastening device 300, etc.) for attaching a linking member (e.g., the linking member 100 of FIGS. 1-3, etc.) to the lamp. Then, the set bolt 400 may be rotated (e.g., via a wrench such as an Allen wrench, a screwdriver, etc.), such that the threaded shank 406 enters the threaded opening and the end 404 is flush with a side of the lamp. Although the set bolt 400 is shown and described as being a threaded bolt for filling unused opening of the lamp, it should be appreciated that other devices (e.g., screws, pins, etc.) having a different configuration may be employed if desired.

Figure 5:
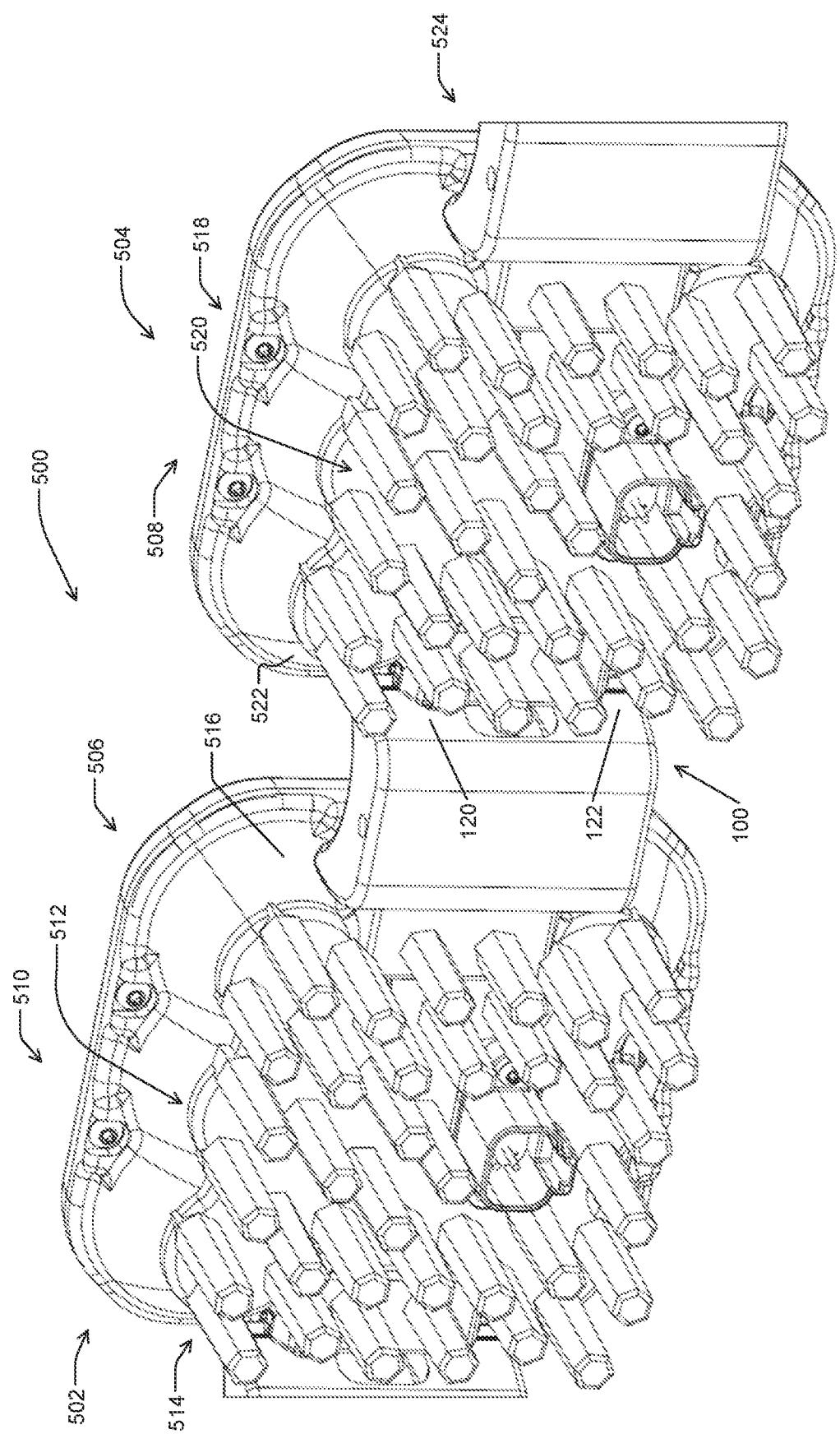
FIG. 5 is an isometric view of an example light array assembly of the present disclosure, where the light array assembly includes two lamps and the linking member of FIG. 1.

FIGS. 5 and 6A-B illustrate an example light array assembly 500 including one or more aspects of the present disclosure. FIGS. 6A-B is sometimes referred to collectively as FIG. 6. Although the light array assembly 500 is presented in one specific arrangement in FIGS. 5-6, other embodiments may include light array assemblies arranged otherwise depending on, for example, the shape, size, number, configuration, etc. of lamps, linking members, etc.

Figure 7:
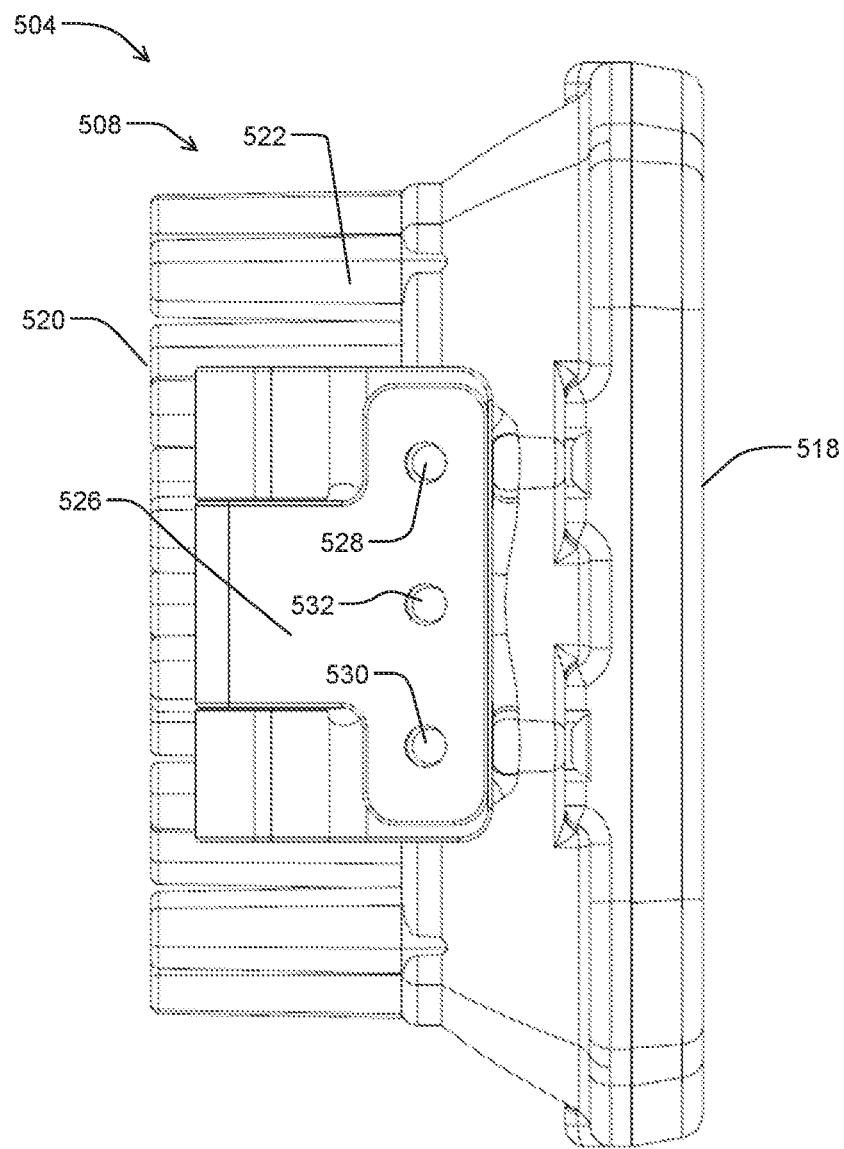
FIG. 7 is a side view of one of the lamps of FIG. 5.

As shown in FIGS. 5-6, the light array assembly 500 generally includes two lamps 502, 504, the linking member 100 of FIGS. 1-3, and four fastening devices 300 of FIG. 4A. The lamps 502, 504 each include a lamp body 506, 508 configured to house one or more light sources (not shown) such as LEDs, etc. The lamp body 506 of the lamp 502 includes a front 510 adjacent to a light beam (or light) when output by its light source, a back 512 opposing the front 510, and opposing sides 514, 516 extending between the front 510 and the back 512. Likewise, the lamp body 508 of the lamp 504 includes a front 518 adjacent to a light beam when output by its light source, a back 520, and opposing sides 522, 524 extending between the front 518 and the back 520. The opposing sides 514, 516, 522, 524 each define multiple openings, as shown in FIG. 7. For example, FIG. 7 illustrates the lamp 504, where the side 522 includes a mounting frame 526 defining three threaded opening 528, 530, 532. The lamp 502 includes a similar mounting frame with three threaded openings on the side 516.

The linking member 100 of FIGS. 5-6 is positioned between and abuts against the lamps 502, 504. More specifically, the outer mating surfaces of the arms 120, 122 (broadly, the side 106) of the linking member 100 abut against the side 522 of the lamp 504, and the outer mating surfaces of the arms 124, 126 (broadly, the side 108) of the linking member 100 abut against the side 516 of the lamp 502.

The fastening devices 300 of FIGS. 5-6 are configured to attach the linking member 100 to the sides 516, 522 of the lamps 502, 504, respectively.

Specifically, each fastening device 300 is inserted (by a user) through one of the channels 138, 140, 142, 144 (not shown in FIGS. 5-6) and into one of the openings of lamps 502, 504. For example, one fastening device 300 is inserted through the channel 138 of the arm 120 and into the opening 528 of the lamp 504 (see FIG. 7), and another fastening device 300 is inserted through the channel 140 of the arm 122 and into the opening 530 of the lamp 504 (see FIG. 7). The other fastening devices 300 are inserted through the channels 142, 144 of the arms 124, 126 and into openings of the lamp 502 in a similar fashion. Then, the fastening devices 300 extending through the channels 138, 140, 142, 144 may be rotated (by a user, via a tool inserted through the recess 132, for example), thereby attaching the linking member 100 with symmetrical surface contact to the lamps 502, 504. In this manner, the linking member 100 may be used to attach the two adjacent and separate lamps 502, 504 together to form a light array.

Additionally, while not necessary, unused openings on, for example, the sides 516, 522 of the lamps 502, 504 may be filled. For example, and with reference to FIG. 7, the opening 532 may not be used in attaching the linking member 100 to the side 522 of the lamp 504. In such embodiments, the set bolt 400 of FIG. 4B or another suitable device may be inserted into the unused opening 532 and then rotated until the set bolt 400 is flush with the mounting frame 526.

With continued reference to FIGS. 5-6, prior to completely tightening the fastening device 300, the linking member 100 is adjustable with respect to one or both lamps 502, 504. This may allow a user to configure the array of lamps (or additional lamps) to define a generally straight line as shown in FIG. 6A or various different curves (especially for four, six, eight or ten lamps in an array (connected by members 100)). For example, a user may adjust the positions of the mating surfaces on the curved arms 120, 122, 124, 126 (broadly, the sides 106, 108) by rotating the linking member 100, as desired, with respect to the lamp 502 and/or the lamp 504. In other words, angles of abutment between the sides 106, 108 of the linking member 100 and the sides 516, 522 of the lamps 502, 504 are adjustable based on the surfaces of the lamps interacting with the curvature defined by the arms 120, 122, 124, 126. For instance, after the fastening devices 300 are inserted (and somewhat tightened) into the openings 528, 530 of the lamp 504 (and additional lamps/members, as desired), the linking member 100 may be rotated a distance defined by the length of the channels 138, 140 (receiving the fastening devices 300), thereby adjusting the position of the curved mating surfaces of the arms 120, 122 with respect to the lamp 504. This is illustrated in FIG. 6B, where the front side 518 of the lamp 504 defines a first axis (shown with dashed arrow 550), and the flat side 112 of the member 100 defines another axis (shown with dashed arrow 552). As shown, the two axes are not parallel, but rather define an angle. In turn, this adjusts the angle of attachment between the linking member 100 and the lamp 504, resulting in a curve in the light array (e.g., such that axes of the lamps may be straight or not, etc.). After a desired curve is achieved, the fastening devices 300 may be further tightened and/or completely tightened to secure the linking member 100 and the lamp 504 together, as explained above, at the specific set angular relationship. Similar adjustments may be made with respect to the linking member 100 and the lamp 502.

Further, each of the lamps 502, 504 may be adjusted in a similar manner to maintain a desired curve along the light array. For example, the linking member 100 may be rotated a distance such that the fastening device 300 (extending through the channel 138 and entering the lamp 504) aligns with a particular notch of the indicia 128, as shown in FIG. 6, or the indicia 128 may align with a notch or reference on the lamp. Then, when the linking member 100 and the lamp 502 are being attached, the linking member 100 may be maintained in the specific alignment until the fastening devices 300 are tightened. As such, by including the indicia 128, 130 with notches in the linking member 100, a user can easily align the mating surfaces on one side of the linking member 100 to a consistent position by referencing the notches on the other side of the linking member 100, and do so for more than one linking member, as desired or required.

Although the light array assembly 500 of FIGS. 5-6 is shown with the linking member 100 having sides with curved mating surfaces and the lamps 502, 504 with generally flat sides abutting against the curved mating surfaces of the linking member 100, it should be appreciated that other light array assemblies may include linking members and lamps arranged differently. For example, FIGS. 11A-B illustrate an example light array assembly 1100 substantially similar to the light array assembly 500 of FIGS. 5-6, but including a linking member 1102 with sides having generally flat mating surfaces 1104, 1106, and lamps 1108, 1110 with curved sides (e.g., curved mounting frames, etc.) 1112, 1114 abutting against the flat mating surfaces 1104, 1106 of the linking member 1102. In such arrangements, the lamps 1108, 1110 may include one or more openings (e.g., slotted openings, etc.) configured to receive fastening devices (e.g., one or more of the fastening devices 300, etc.).

With this configuration, the linking member 1102 and the lamps 1108, 1110 can be attached, and the linking member 1102 can be adjusted with respect to one or both lamps 1104, 1106 in a similar manner as explained above relative to FIGS. 5-6, thereby allowing a user to configure the array of lamps (or additional lamps) to define a straight line or various different curves as desired.

Figure 8:
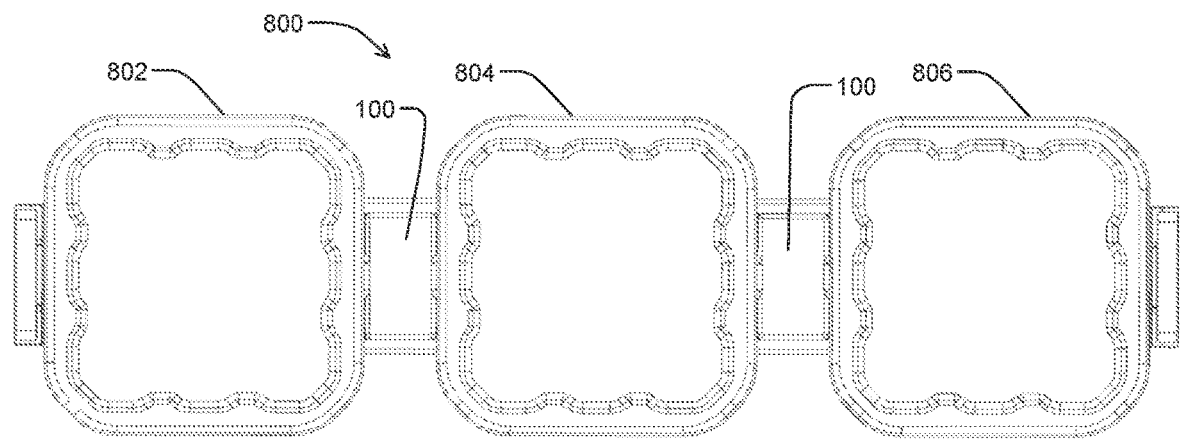
FIG. 8 is a front view of an example light array assembly of the present disclosure, where the light array assembly includes three lamps and two linking members of FIG. 1.

While the light array assemblies 500, 1100 of FIGS. 5-6 and 11 are shown and described as including two lamps and one linking member, it should be appreciated that any of the light array assemblies herein may include more than two lamps and more than one linking member. For example, FIG. 8 illustrates an example light array assembly 800 substantially similar to the light array assembly 500 of FIGS. 5-6, but including more lamps and more linking members. Specifically, the light array assembly 800 includes three lamps 802, 804, 806 (each similar to the lamps 502, 504 of FIGS. 5-6), and two linking members 100 of FIGS. 1-3. In this configuration, one of the linking members 100 is positioned between and attaching the lamps 802, 804 together, and the other linking members 100 is positioned between and attaching the lamps 804, 806 together.

Figure 9:
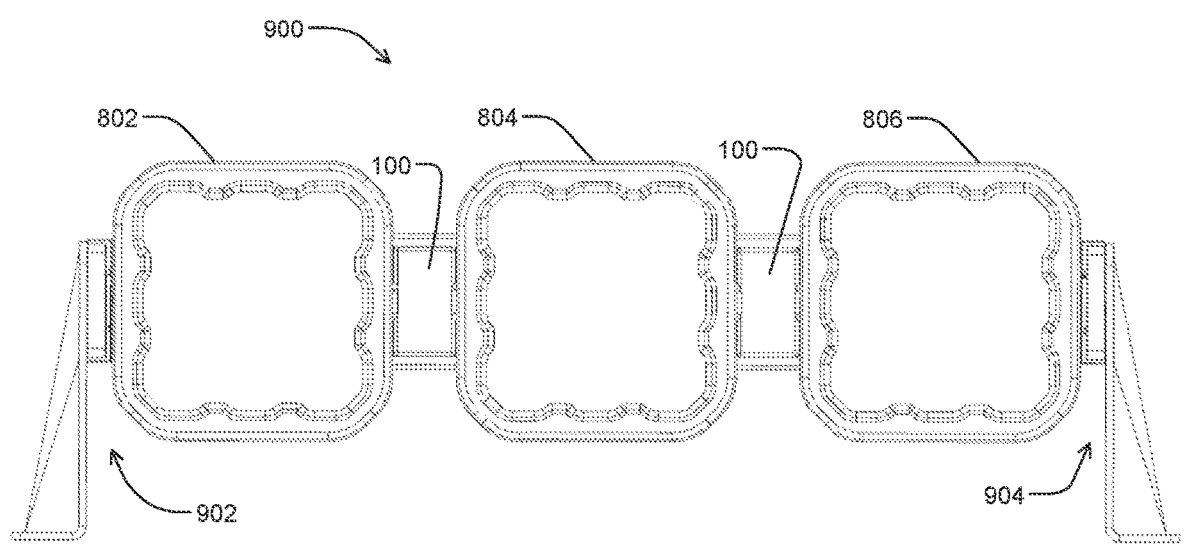
FIG. 9 is a front view of an example light array assembly of the present disclosure, where the light array assembly includes three lamps, two linking members of FIG. 1, and two mounting brackets.

Additionally, any one of the light array assemblies herein may be attached to a vehicle. For example, FIG. 9 illustrates an example light array assembly 900 substantially similar to the light array assembly 800 of FIG. 8, but including mounting brackets configured to attach the light array assembly 900 to a vehicle. Specifically, the light array assembly 900 includes the three lamps 802, 804, 806 and the two linking members 100 of FIG. 8, and mounting brackets 902, 904. The mounting bracket 902 is attached to the lamp 802 on a side opposing the lamp 804, and the mounting bracket 904 is attached to the lamp 806 on a side opposing the lamp 804. In such configurations, the mounting brackets 902, 904 may be attached to the lamps 802, 804 via openings on mounting frames as explained above with reference to FIG. 7.

It should be appreciated that the mounting brackets 902, 904, may be structured to fasten to or mount flush or flat with the lamps 802, 806, respectively. Alternatively, in one or more embodiments, the mounting bracket 902, 904 may be configured similar to the linking member 100, and specifically, the arms similar to curvature of the arms 120, 122, 124, 126 to define the same or a similar curvature, whereby the curve of the light array may extend to the mounting brackets 902, 904. In yet another alternatively, mounting brackets may be configured otherwise to account for the curve of the light array, as described above, and the specific mounting location available on a vehicle, etc.

Figure 10:
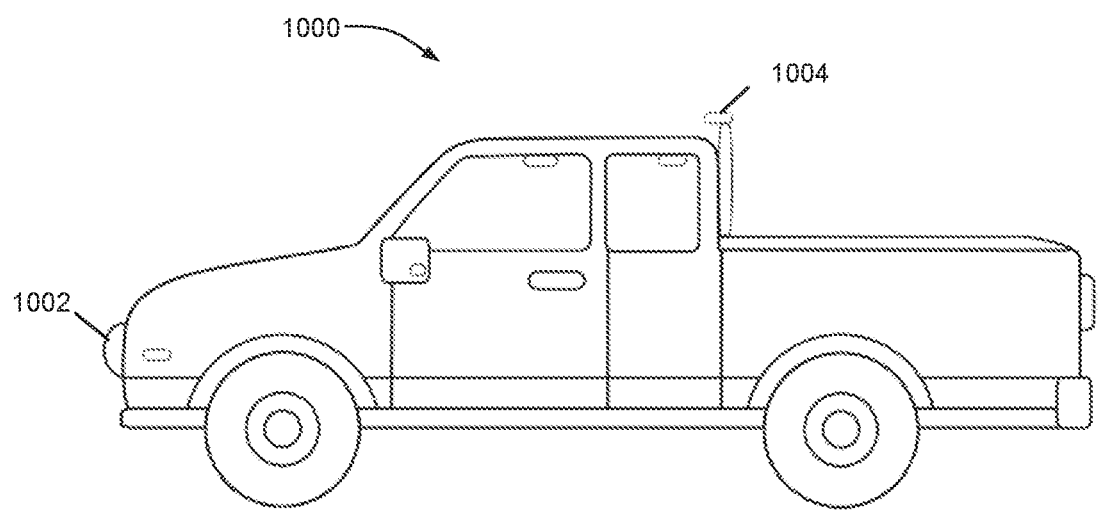
FIG. 10 is a diagram of an example vehicle of the present disclosure, where the vehicle includes one or more light array assemblies.

FIG. 10 illustrates an example vehicle 1000 in which one or more aspects of the present disclosure may be implemented. As shown in FIG. 10, the vehicle 1000 is a truck including light arrays 1002, 1004. In such examples, one or both light arrays 1002, 1004 may be any one of the light array assemblies herein such as the light array assembly 500 of FIGS. 5-6, the light array assembly 800 of FIG. 8, light array assembly 900 of FIG. 9, etc. Additionally, one or both light arrays 1002, 1004 may be curved as desired, as explained above. Although the vehicle 1000 is shown in FIG. 10 as including a truck, it should be appreciated that other types of consumer vehicle such as a car, a van, an ATV, a motorcycle, a watercraft, etc. may implement one or more of the light array assemblies herein.

In various embodiments, the lamps described herein may be standalone, aftermarket lamps. For example, the aftermarket lamps may generally include a standard mounting frame with openings, such as the mounting frame 526 of FIG. 7. As such, aftermarket lamps may be linked together through a shared linking member such as the linking member 100 of FIGS. 1-3 via the standard mounting frames on the lamps. In this way, a user can easily link standalone, aftermarket lamps together, without modifying the lamps. A user may also easily remove the linking member from the multiple independent lamps, and immediately use the lamps without any lingering mounting features to detract from the lamp cosmetically.

Additionally, the linking members may be used with a variety of different lamps. For example, the linking members may be used with different sized, shaped, etc. lamps. In such examples, minor modifications to the linking members (e.g., the placement of channels, the size of the channels, etc.) may be necessary depending on, for example, the size, shape, configuration, etc. of the lamps.

In view of the above, the linking assemblies herein leverage a uniquely configured linking member, which may include a single piece construction having curved or flat mating surfaces to enable the linking of adjacent independent lamps (e.g., aftermarket lamps, etc.) with flat or curved surfaces to form a straight or curved light array. With this configuration, the linking members provide an easily adaptable, versatile, cost-effective, and convenient manner of linking adjacent standalone lamps together with minimal components, while avoiding use of pin-type hinges or multi-piece structures and modifications of the lamps, but enabling desirable adjustments between the linking members and the lamps to form a straight or curved light array.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may also be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having,"are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to,""coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. §112(f) unless an element is expressly recited using the phrase "means for," or in the case of a method claim using the phrases "operation for"or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A light array assembly comprising:
   a first lamp and a second lamp each including a lamp body housing a light source configured to output light, each lamp body including a front adjacent to the light when output by the light source, a back opposing the front, and two opposing sides extending between the front and the back;
   a linking member positioned between the first lamp and the second lamp, the linking member including first and second opposing sides, the first side including a first curved surface defining a first channel, the second side including a second curved surface defining a second channel;
   a first fastening device extended through the first channel to secure the first curved surface of the first side of the linking member to one of the opposing sides of the first lamp; and
   a second fastening device extended through the second channel to secure the second curved surface of the second side of the linking member to the other one of the opposing sides of the second lamp, and
   wherein an angle between the front of the first lamp and the front of the second lamp is adjustable based on contact of the one of the opposing sides of the first lamp along the first curved surface of the first side.

2. The light array assembly of claim 1, wherein an angle between the first and second lamp adjustable based on contact of the other one of the opposing sides of the second lamp along the second curved surface of the second side.

3. The light array assembly of claim 1, wherein the second side of the linking member includes indicia configured to indicate different angles between the second side of the linking member and the other one of the opposing sides of the second lamp.

4. The light array assembly of claim 1, wherein the first side of the linking member includes indicia configured to indicate different angles between the first side of the linking member and the one of the opposing sides of the first lamp.

5. The light array assembly of claim 1, wherein the first and second fastening devices are threaded bolts.

6. The light array assembly of claim 1, wherein the first and second opposing sides of the linking member define a recess therebetween, and wherein the first and second channels extend to the recess.

7. The light array assembly of claim 1, wherein the first channel of the linking member extends in a plane perpendicular to the first side, and/or wherein the second channel of the linking member extends in a plane perpendicular to the second side.

8. The light array assembly of claim 1, wherein the first channel has a slot shape, and wherein the second channel has a slot shape.

9. The light array assembly of claim 1, wherein the linking member includes a monolithic body having the first and second opposing sides.

10. A linking assembly configured to attach two lamps of a light array together, the linking assembly comprising:
    a linking member including first and second opposing sides, the first side including a first curved surface defining a first channel, the second side including a second curved surface defining a second channel;

a first fastening device configured to extend through the first channel, thereby securing the first curved surface of the first side of the linking member to a side of a first lamp; and a second fastening device configured to extend through the second channel, thereby securing the second curved surface of the second side of the linking member to a side of a second lamp, wherein an angle between the first and second lamps is adjustable based on contact of the side of the first lamp along the first curved surface of the first side.

11. The linking assembly of claim 10, wherein an angle between the first and second lamps is adjustable based on contact of the side of the second lamp along the second curved surface of the second side.

12. The linking assembly of claim 11, wherein the second side of the linking member includes indicia configured to indicate different angles between the second side of the linking member and the side of the second lamp.

13. The linking assembly of claim 10, wherein the first side of the linking member includes indicia configured to indicate different angles between the first side of the linking member and the side of the first lamp.

14. The linking assembly of claim 10, wherein the first and second fastening devices are threaded bolts.

15. The linking assembly of claim 10, wherein the first and second opposing sides of the linking member define a recess therebetween, and wherein the first and second channels extend to the recess.

16. The linking assembly of claim 10, wherein the first channel of the linking member extends in a plane perpendicular to the first side, and/or wherein the second channel of the linking member extends in a plane perpendicular to the second side.

17. The linking assembly of claim 10, wherein the first channel has a slot shape, and wherein the second channel has a slot shape.

18. The linking assembly of claim 10, wherein the linking member includes a monolithic body having the first and second opposing sides.

19. The linking assembly of claim 10, wherein at least one of the first side and the second side of the linking member is curved.

\* \* \* \* \*